United States Patent
Maas et al.

(10) Patent No.: US 6,613,152 B1
(45) Date of Patent: Sep. 2, 2003

(54) DEXTRINIZATION OF STARCH

(75) Inventors: Augustinus Arnoldus M. Maas, Haren (NL); Johanuddes Cornelis P. Hopman, Makkum (NL); Ronald Peter W. Kesselmans, Annen (NL)

(73) Assignee: Cooperatieve Verkoop-en Productievereniging van Aardappelmeel en Derivaten Avebe B.A., JaVeendam (NL)

( * ) Notice: Subject to any disclaimer, the term of this patent is extended or adjusted under 35 U.S.C. 154(b) by 0 days.

(21) Appl. No.: 09/719,203

(22) PCT Filed: Jun. 4, 1999

(86) PCT No.: PCT/NL99/00349

§ 371 (c)(1),
(2), (4) Date: Jan. 29, 2001

(87) PCT Pub. No.: WO99/64466

PCT Pub. Date: Dec. 16, 1999

(30) Foreign Application Priority Data

Jun. 10, 1998 (EP) .............................................. 98201944

(51) Int. Cl.⁷ ......................... C08B 30/18; C08B 31/00; C08B 35/00
(52) U.S. Cl. .......................................... 127/38; 127/71
(58) Field of Search ...................... 127/38, 71

(56) References Cited

U.S. PATENT DOCUMENTS

| 2,738,305 A | | 3/1956 | Lohmar et al. |
| 3,408,214 A | | 10/1968 | Mentzer |
| 3,425,868 A | | 2/1969 | Lanphere |
| 4,549,909 A | | 10/1985 | Samuel et al. |
| 5,817,180 A | * | 10/1998 | Ferguson et al. .............. 127/32 |

FOREIGN PATENT DOCUMENTS

| JP | 53 028713 A | 3/1978 |
| WO | 93/09145 | 5/1993 |

OTHER PUBLICATIONS

Zhu, et al., "Composition and structural analysis of alpha-—dextrins from potato amylopectin," Carbohydrate Research 288 (1996) 155–174.

* cited by examiner

Primary Examiner—David Brunsman
(74) Attorney, Agent, or Firm—Hoffmann & Baron, LLP

(57) ABSTRACT

The invention relates to a process for preparing a starch dextrin wherein a starch comprising at least 95 wt. %, based on dry substance of the starch, of amylopectin or a derivative of said starch is dextrinized. The invention further relates to a dextrin obtainable by said process and to the use thereof as an adhesive.

22 Claims, No Drawings

DEXTRINIZATION OF STARCH

This application is a 371 of PCT/NL99/00349 filed Jun. 4, 1999.

The invention relates to a process for preparing a starch dextrin.

Carbohydrate intermediates between starch and the sugars produced from starch by hydrolysis by dilute acids, amylase or dry heat are usually referred to as dextrins. In fact, a dextrin is an oligomer of the glucose monomers, of which starch is a polymer. It is an amorphous, yellow or white powder, which is (partly) soluble in water.

Dextrins are used for numerous industrial applications. Some examples of relevant areas are the adhesive industry, the paper industry, the pharmaceutical industry, the mining industry, the food industry, and the textile industry.

Sometimes a distinction is made between malto-dextrins and pyrodextrins. The first being the product of dextrinization of starch using an enzyme; the latter being the product of dextrinization of starch using heat. The large scale production of dextrins for non-food applications primarily concerns pyrodextrins.

On the market, dextrins are available in three major varieties: British gums, white dextrins and yellow dextrins. The chemical changes occurring in starch during dextrinization are complex and not fully understood. It appears that three major reactions may be involved. The relative role of each will vary depending on whether white dextrins, yellow dextrins or British gums are being produced. The major reactions include hydrolysis, transglucosidation and repolymerization. These reactions have been described in "Modified Starches: Properties and Uses", O. B. Wurzburg, CRC Press Inc., 1987.

The hydrolysis is believed to involve an acid-catalyzed scission of $\alpha$-D-(1,4), and probably $\alpha$-D-(1,6) glucosidic linkages in the starch. As a result, there is a decrease in the molecular weight of the starch which is reflected in a decrease in viscosity of a solution of the dextrin that is being prepared. Further, the number of aldehydic end groups increases due to the hydrolysis of the glucosidic bonds. Low pH and moisture promote this type of reaction.

The transglucosidation is considered to be a recombination of the fragments resulting from the hydrolysis with free hydroxyl groups to produce branched structures. The branching increases as the heat conversions are carried out at higher temperatures, or as the reaction time increases.

In conversions wherein yellow dextrins are prepared, there is some evidence that repolymerization of glucose or oligosaccharides into larger molecules may take place.

White dextrins may be obtained by heating acidified native starch at temperatures between 80 and 110° C. Under these conditions, the starch is hydrolyzed, as a result of which the long chain of glucose units of the starch molecule is reduced considerably. White dextrins generally have a limited cold water solubility and a limited stability of solution. After cooling, a cooked, aqueous solution of white dextrins soon sets to a paste.

Yellow dextrins are prepared at higher temperatures, viz. 150–170° C. As a result of a transglucosidation reaction, they have a more branched structure compared with the white dextrins. Further, they have a higher cold water solubility, as well as a more hydrophilic character than white dextrins.

British gums are prepared by applying heat at a relatively high pH in comparison with the white and yellow dextrins. As a result of the high temperatures employed, British gums are considerably darker in color than white dextrins.

The economics of industrial processes are favored by a constant quality of the (raw) materials used in these processes. Important parameters in this respect, concerning dextrins, are viscosity and stability of the product in solution. A significant alteration of the viscosity can have serious consequences for the performance of the process and to the quality of the end product thereof. Thus, a stable viscosity in time of a dextrin is very important, particularly when a solution of the product is to be stored over a certain, prolonged period of time. This latter aspect facilitates the utilization of dextrins as ready to use products in all kinds of formulations. Also, the flexibility, and therefore the market orientation, of the manufacturer is enhanced when the material properties of dextrin based products are not affected by using solutions of dextrins which have been kept in storage over a certain period of time. The present invention aims at providing a process for preparing a starch dextrin which is very stable, and thus has a long shelf-life.

Surprisingly, it has been found that a very stable dextrin may be prepared by dextrinizing a starch that has a very high amylopectin content. Thus, the invention is directed to a process for preparing a starch dextrin wherein a starch comprising at least 95 wt. %, preferably at least 98 wt. %, based on dry substance of the starch, of amylopectin or a derivative of said starch is dextrinized.

Not only has a process according to the invention the great advantage of leading to a dextrin which is very stable in solution and remains substantially constant in quality after a period of storage, it has been found that the preparation process requires less energy and can be effected in less time than the preparation processes of conventional dextrins. In addition, it has been found that a dextrin which has been prepared in accordance with the present invention is more stable, yet lighter in color than the conventional yellow dextrins, particularly in the form of an aqueous solution.

As has been set forth above, in accordance with the invention, a dextrin is prepared from a starch which has a very high amylopectin content. Most starch types consist of granules in which two types of glucose polymers are present. These are amylose (15–35 wt. % on dry substance) and amylopectin (65–85 wt. % on dry substance). Amylose consists of unbranched or slightly branched molecules having an average degree of polymerization of 1000 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose.

Of some cereal types, such as barley, maize, millet, wheat, milo, rice and sorghum, there are varieties of which the starch granules nearly completely consist of amylopectin. Calculated as weight percent on dry substance, these starch granules contain more than 95%, and usually more than 98% amylopectin. The amylose content of these cereal starch granules is thus less than 5%, and usually less than 2%. The above cereal varieties are also referred to as waxy cereal grains, and the amylopectin-starch granules isolated therefrom as waxy cereal starches.

In contrast to the situation of cereals, root and tuber varieties of which the starch granules nearly exclusively consist of amylopectin are not known in nature. For instance, potato starch granules isolated from potato tubers usually contain about 20% amylose and 80% amylopectin (wt. % on dry substance). During the past 10 years, however, successful efforts have been made to cultivate by genetic modification potato plants which, in the potato tubers, form starch granules consisting for more than 95 wt. % (on dry substance) of amylopectin. It has even been found feasible to produce potato tubers comprising substantially only amylopectin.

In the formation of starch granules, various enzymes are catalytically active. Of these enzymes, the granule-bound starch synthase (GBSS) is involved in the formation of amylose. The presence of the GBSS enzyme depends on the activity of genes encoding for said GBSS enzyme. Elimination or inhibition of the expression of these specific genes results in the production of the GBSS enzyme being prevented or limited. The elimination of these genes can be realized by genetic modification of potato plant material or by recessive mutation. An example thereof is the amylose-free mutant of the potato (amf) of which the starch substantially only contains amylopectin through a recessive mutation in the GBSS gene. This mutation technique is described in, inter alia, J. H. M. Hovenkamp-Hermelink et al., "Isolation of amylose-free starch mutant of the potato (*Solanum tuberosum L.*)", Theor. Appl. Gent., (1987), 75:217–221, and E. Jacobsen et al., "Introduction of an amylose-free (amf) mutant into breeding of cultivated potato, *Solanum tuberosum L.*, Euphytica, (1991), 53:247–253.

Elimination or inhibition of the expression of the GBSS gene in the potato is also possible by using so-called antisense inhibition. This genetic modification of the potato is described in R. G. F. Visser et al., "Inhibition of the expression of the gene for granule-bound starch synthase in potato by antisense constructs", Mol. Gen. Genet., 1991), 225:289–296.

By using genetic modification, it has been found possible to cultivate and breed roots or tubers, for instance potatoes, yam, and cassave (Patent South Africa 97/4383), of which the starch granules contain little or no amylose. As referred to herein, by amylopectin starch is intended the starch granules isolated from a natural source having an amylopectin content of at least 95 wt. % based on dry substance.

Regarding production possibilities and properties, there are significant differences between amylopectin-potato starch on the one hand, and the waxy cereal starches on the other hand. This particularly applies to waxy maize starch, which is commercially by far the most important waxy cereal starch. The cultivation of waxy maize, suitable for the production of waxy maize starch is not commercially feasible in countries having a cold or temperate climate, such as The Netherlands, Belgium, England, Germany, Poland, Sweden and Denmark. The climate in these countries, however, is suitable for the cultivation of potatoes. Tapioca starch, obtained from cassave, may be produced in countries having a warm climate such as is found in regions of South East Asia and South America.

The composition and properties of root and tuber starches, such as amylopectin-potato starch and tapioca amylopectin-starch differ from those of the waxy cereal starches. Amylopectin-potato starch has a much lower content of lipids and proteins than the waxy cereal starches. Problems regarding odor and foaming, which, because of the lipids and/or proteins, may occur when using waxy cereal starch products (native and modified), do not occur or occur to a much lesser degree when using corresponding amylopectin-potato starch products. In contrast to the waxy cereal starches, amylopectin-potato starch contains chemically bound phosphate groups. As a result, amylopectin-potato starch products in a dissolved state have a distinct polyelectrolyte character.

The invention contemplates the preparation of dextrins from cereal and fruit starches on the one hand, and root and tuber starches on the other hand. Of the cereal starches, waxy maize starch has proven suitable. In general, however, root and tuber starches are more preferred. As has been indicated above, it is advantageous to use a starch having a very low content of lipids and/or proteins. The presence of lipids and/or proteins increases the risk of undesired side reactions taking place, such as Maillard reactions. The desire to avoid these reactions puts a limitation on the reaction conditions possible during the dextrinization. In addition, it has been found that lipids present in the starch may form complexes with the dextrins that are formed in a process according to the invention. Dependent on the application of the dextrins, these complexes may lead to less advantageous results. The use of amylopectin-potato starch and amylopectin-tapioca starch has been found to lead to a particularly stable, light colored dextrin.

Suitable derivatives of a starch comprising at least 95 wt. %, based on dry substance of the starch, of amylopectin may be prepared via etherification, esterification, or degradation reactions, or combinations thereof. Preferably, a starch derivative obtained by etherification is used. For a general description of these modification reactions of starch reference is made to "Modified Starches: Properties and Uses", O. B. Wurzburg, CRC Press Inc., 1987.

Etherification of starch may be effected by reaction with a reagent comprising a halogen, halohydrin, epoxide or glycidyl reactive site. The reaction may be performed under (semi-)dry conditions, in suspension (water or organic solvent), or in aqueous solution. Preferably, the reaction is carried out in aqueous suspension. Etherification leads to alkylated, hydroxyalkylated, or hydroxyarylated starches. The alkyl or aryl chain of the substituent may vary from 1 to 20 carbon atoms, preferably from 1 to 12 carbon atoms, more preferably from 1 to 4 carbon atoms. Suitable examples of reagents include methyl chloride, ethylene oxide, propylene oxide, allyl glycidyl ether, propyl glycidyl ether, phenyl glycidyl ether and combinations thereof.

In a special case of etherification, cationic starch derivatives may be prepared. For example, diethylaminoethyl chloride, glycidyltrialkylammonium salts, or 1-chloro-2-hydroxypropyltrialkyl ammonium salts, wherein the alkyl groups may vary from 1 to 20 carbon atoms or wherein one or more alkyl groups are replaced by allyl groups, are used for the preparation of cationic starches. It is also possible to use any combination of alkylated, hydroxyalkylated, hydroxyarylated, or cationically derivatized starches may be employed.

The manner in which the dextrinization is performed is not critical. A highly convenient manner, however, comprises the treatment of the starch comprising at least 95 wt. %, based on dry substance of the starch, of amylopectin or a derivative of said starch, with an acid at an increased temperature.

Suitable acids in this regard include both Brønsted and Lewis acids. Particularly suitable are mineral acids, such as hydrochloric acid, sulfuric acid, nitric acid, phosphoric acid and combinations thereof. The amount in which the acid is added to the starch to be converted to dextrins depends on the desired properties of the dextrin to be prepared and the reaction time available. When phosphoric acid is used, it is also possible to use partially neutralized phosphoric acid. Under the preferred reactions conditions the pH is lower than 7, more preferably lower than 4. Optionally, the dextrins may be neutralized by mixing with alkaline salts, such as sodium carbonate.

In a highly preferred embodiment, a process according to the invention is carried out in the presence of a co-reagent.

Examples of suitable co-reagents are hydrophobic compounds, such as carboxylic acids, and alcohols. It has been found that the presence of a hydrophobic compound has a highly beneficial effect on the stability of the dextrin that it produced. Preferred hydrophobic compounds are carboxylic acids and alcohols. Carboxylic acids, preferably linear carboxylic acids, having from 2 to 22, preferably from 8 to 16 carbon atoms have been found to be highly suitable. The alcohol is preferably a linear alcohol having from 4 to 22, preferably from 6 to 16, more preferably from 6 to 10 carbon atoms. Very good results have been obtained using 1-octanol. Combinations of urea and/or alcohols and/or carboxylic acids may also be employed. The co-reagent may be used in amounts up to 25 wt. %, preferably less than 20 wt. %, based on the starch (dry weight). Particularly good results have been obtained using 5 to 15 wt. %, based on the starch (dry weight), of a co-reagent.

It has further been found that the presence of urea during a dextrinization process according to the invention promotes the reaction rate as well as the yield of the dextrinization reaction. Urea may suitably be used in amounts up to 25 wt. %, preferably less than 20 wt. %, based on the starch (dry weight). Generally, the amount of urea will lie between 5 and 15 wt. %, based on the starch (dry weight).

Preferably, the treatment of the starch or the derivative thereof will be carried out in the absence of a solvent, i.e. under substantially dry conditions. These conditions may be achieved by drying the mixture of the starch to be converted and the acid before heating. Preferably, the mixture will be dried to a moisture content of less than 10 wt. %, more preferably to less than 5 wt. %. Drying may be performed by any known drying technique, such as fluid bed, pneumatic or flash drying.

The temperature at which the starch will preferably be converted to dextrins lies between 75 and 250° C., more preferably between 100 and 180° C., even more preferably between 130 and 170° C.

The dextrinization process may be carried out using any known technology, such as the Noredux process, or the use of a fluid bed reactor, or a rotating vessel. Preferably, the dextrinization is carried out in a fluid bed reactor. Particularly when the dextrinization is performed under substantially dry conditions it is advantageous to use a fluid bed reactor in order to provide an optimal contact between the hot air in the reactor and the starch that is being dextrinized.

It will be understood that the invention also encompasses a dextrin obtainable by a process as described hereinabove. The obtained dextrin has all the advantageous properties of dextrins based on normal starches, combined with an increased stability and improved adhesive properties.

As has been indicated above, one of the important applications of dextrins is related to the utilization as an adhesive. In this field, the use of dextrins prepared in accordance with the invention leads to very advantageous results.

In the past, dextrins have been widely used as an adhesive, mostly for paper substrates. Dextrins have a rather long setting time. This is the time during which heat, pressure or a combination thereof is applied in order to set the adhesive, i.e. to convert the adhesive into a fixed or hardened state by chemical or physical action, such as condensation, polymerization, oxidation, vulcanization, gelation, hydration, or evaporation of volatile constituents. Because of their long setting time, dextrins have been replaced in the adhesive industry by synthetically prepared polymers, such as polyvinyl acetate or polyvinyl alcohol.

It has presently been found, that the dextrins according to the invention can compete with the synthetic adhesives that are currently on the market. A stable solution of a dextrin prepared from a starch comprising at least 95 wt. %, based on dry substance of the starch, of amylopectin, or a derivative of such a starch, has a significantly shorter setting time when used as an adhesive than the conventional white and yellow dextrins prepared from native starch.

The above described derivatives of starch comprising at least 95 wt. %, based on dry substance of the starch, of amylopectin, particularly the derivatives obtained by etherification of the starch, have been found to be very suitable for use as adhesives. They require a shorter setting time than an adhesive based on a dextrin prepared from regular starch. Furthermore, it has been found that the presence of the above described hydrophobic compounds during the dextrinization process has a highly beneficial effect on the adhesive performance and setting time of a dextrin prepared in accordance with the invention. Extremely good results have been achieved by using a dextrin which is prepared of amylopectin-potato or tapioca starch in the presence of 1-octanol or urea.

The substrates for which a dextrin according to the invention can be used as an adhesive, may be of any material. The best results, however, are achieved when substrates of somewhat hydrophilic materials are being glued together. Suitable examples of substrates include paper, cardboard, mineral pigments, several plastic materials, and so forth. Preferably, the substrate is of a paper or cardboard material. Particularly good results have been obtained with the use of a dextrin according to the invention for remoistenable paper, such as on stamps or envelopes.

In order to use a dextrin according to the invention as an adhesive, it has to be formulated into a suitable formulation. The composition of said formulation will depend on the circumstances wherein the adhesive will be applied and the material of the substrates. Based on his general knowledge of using conventional dextrins as adhesives, the skilled person will be able to select a suitable formulation. An overview of formulations of adhesives of conventional dextrins may be found in, for instance, "The Handbook of Adhesives, Starch and its Derivatives", Ed. J. Skeist, Ch. 12, pp. 170–180, Reinhold Publishing Corp. Chapman & Hall, London, 1962; "Experiments on the Preparation of Water-reactive Adhesives based on Starch", K. Nitzl, H. Koller, H. G. Koch, Adhesion, Vol. 22, No. 12, pp. 396–398, 401–402, 1978; or "Animal, Vegetable or Mineral, 325 Adhesives and their Applications", B. Guise, Packaging, Rickmansworth, Vol. 67, No. 4, pp. 8–11, 1996.

Another important application of dextrins is concerned with the paper industry. In this field, the use of dextrins prepared in accordance with the invention leads to advantageous binding and mechanical properties when used in a coating or surface sizing in the paper making. The improved adhesive properties of an amylopectin based dextrin leads to improved paper properties and to better mechanical properties during the coating or surface sizing stage in the paper making process. A dextrin prepared according to the invention has been found to be compatible with compounds that are used in coatings for paper, such as mineral pigments. The present dextrins may be used in the paper industry in a manner analogous to the way in which conventional dextrins are employed. For an explanation of the use of dextrins in the paper industry reference is made to "The Coating Processes, by the Coating Process Committee of the Coating and Graphic Arts Division Committee Assignment No. 1571-.870110.02", J. C. Walter, Tappi Press, Atlanta, 1993 and to "Starch and Starch Products in Paper Coating, A project of the Coating Binders Committe of The TAPPI Coating and Graphic Arts Divison", ed. R. L. Kearney, H. W. Maurer, Tappi Press, Atlanta, 1990.

A dextrin according to the invention can further be used in the textile industry. Particularly, the increased viscosity stability and good film forming properties of the present dextrin make it possible to use it as a liquid finishing agent. The finishing process, which is known per se, will impart an improved grip to a fabric. Also, the mass per unit areas is increased. Typical for the use of starch based finishing agents is the increased stiffness. A dextrin according to the invention has been found to be very suitable in a typical pad application. Products manufactured in such a process are for instance workware apparel, upholstery, bed linen and non-wovens. For a discussion of the finishing process and the application of finishing agents in the textile industry, reference is made to "Lexicon für Textilveredelung" by H. K. Rouette, bands 2 and 3, Laumann Verlag, Düllman, 1995.

The invention will now be further elucidated by the following, non-restrictive examples.

EXAMPLE I

Preparation of an Amylopectin Dextrin

In a Hobart mixer, 698 g (600 g dry matter) of amylopectin potato starch (amylopectin content >98 wt. %) was mixed with 158 g solution of 453 mg of HCl in water for 30 minutes. The mixture was equilibrated at 4° C. for 16 hours and dried to 3.9% moisture in a Retsch fluid bed dryer at 60–80° C. for 2 hours. The pH of the mixture as measured in a suspension of water (1 part of mixture to 2 parts of water) was 2.94. The mixture was heated at 165° C. in a fluid bed reactor for 2 hours yielding a light yellow powder. Viscosity, viscostability and adhesive performance were tested as described in Example VI.

EXAMPLE II

Preparation of an Amylopectin/octanol Dextrin

In a Hobart mixer, 588 g (500 dry matter) of amylopectin potato starch (amylopectin content >98 wt. %) was mixed with 126 g solution of 366 mg of HCl in water. After the addition was completed, 62.3 g of 1-octanol was added dropwise while stirring. Total stirring time was 30 minutes. The mixture was equilibrated at 4° C. for 16 hours and dried to a moisture content of 3.1% in a Retsch fluid bed dryer at 60–80° C. for 2 hours. The pH of the mixture as measured in a suspension in water (1 part of mixture to 2 parts of water) was 2.78. The mixture was heated at 165° C. in a fluid bed reactor for 2 hours yielding a light yellow powder. Viscosity, viscostability and adhesive performance were tested as described in Example VI.

EXAMPLE III

Preparation of a Cationic Amylopectin Dextrin

In a Hobart mixer, 723 g (600 g dry matter) of a cationic amylopectin potato starch (MS(hydroxypropyltrimethyl ammonium) ca. 0.045) (amylopectin content >98 wt. %) was mixed with 134 g solution of 1022 mg of HCl in water for 30 minutes. The mixture was equilibrated at 4° C. for 16 hours and dried to 2.6% moisture in a Retsch fluid bed dryer at 60–80° C. for 2 hours. The pH of the mixture as measured in a suspension in water (1 part of mixture to 2 parts of water) was 2.57. The mixture was heated at 165° C. in a fluid bed reactor for 2 hours yielding a light yellow powder. Viscosity, viscostability and adhesive performance were tested as described in Example VI.

EXAMPLE IV

Dextrinization of Amylopectin Potato Starch in the Presence of Sulfuric Acid, Phosphoric Acid and Urea In Hobart mixer, 646 g (550 g dry matter) of amylopectin potato starch (amylopectin content >98 wt. %) was mixed with a solution of 103 g urea, 41.2 g of 85% phosphoric acid, 16.9 g sulfuric acid (100%) in 111 g of water for 30 minutes. The mixture was equilibrated at 4° C. for 16 hours and dried to 5.0% moisture in a Retsch fluid bed dryer at 60–80° C. for 2 hours. The mixture was heated at 120° C. in a fluid bed reactor for 0.5 hours yielding an off-white powder. Viscosity, viscostability and adhesive performance were tested as described in Example VI.

EXAMPLE V

Dextrinization of a Cationic Amylopectin Potato Starch in the Presence of Sulfuric Acid and Urea In a Bear mixer, 1836 g (1500 g dry matter) of cationic potato starch (MS(hydroxypropyltrimethyl ammonium) ca. 0.035) was mixed with a solution containing 187.5 g of urea, 27.5 g of sulfuric acid and 230 g of water during 60 minutes. The mixture was equilibrated at 4° C. for 16 hours and dried to 1.3% moisture in a Retsch fluid bed dryer at 60–90° C. for 1.25 hour. The mixture was heated at 145° C. in a fluid bed reactor for 1.25 hour, yielding an off-white powder. Viscosity, viscostability and adhesive performance were tested as described in Example VI.

EXAMPLE VI

Adhesive Performance

Dissolving Yellow Dextrins

Demineralized water and dextrinized starch are mixed with a mass ratio of 1:1, in a vessel (370 ml) at room temperature. When needed an extra portion demi water is added in order to obtain a viscosity level between 2000–4000 mpa·s. The mixtures are then heated at 80° C. in a waterbath for 30 minutes, under continuous stirring at 200 rpm. The stirrer has a rectangular design and contains 8 holes (diameter per hole: 10 mm) which are homogeneously distributed over the surface (dimensions: 80×45 mm). The remaining solution is cooled to 20° C. and stored in a refrigerator at 20° C. for 3 months.

Dry Solids

The concentration of a dextrin solution is determined by means of a refractometer (Atago AX-1000; 20° C.), and presented as a brix value.

Viscosity and Viscostability

The viscosity of a dextrin solution is determined by means of a viscometer (Brookfield RVT-DV; 20 rpm, reading after 20 seconds). The viscosity is determined at various moments in time in order to establish a viscostability profile. This is done at 1, 7 and 14 days after dissolving at 20° C.

Practical Adhesion

The practical adhesion is determined according to the pulling test method that is performed with a Fipago-Adhesion tester (system PKL). The test is performed in a conditioning room capable of maintaining a relative humidity of 50±2% at 23±1° C. The paper adherends are stored under the same conditions. A dextrin solution is tested after 16–24 hours from the moment of preparation. A thin film (60 μm) of a dextrin solution is applied on the sieve side of a standard kraft paper sample (dimensions: 70 g/m²; 200×30 mm) by means of a wire winded rot. Immediately the glued paper is placed on top of another kraft (dimensions: 200 g/m²; 100×55 mm) adherend (felt side). The open time in this experiment is set at 3 seconds. The closed time is varied within the interval of 5–90 seconds. Every dextrin is characterised by at least five different closed times, yielding a more or less sigmoidal curve. This curve represents the work needed to overcome the bond strength as function of closed time. In all cases fibre tearing is observed, cohesive failure of the adherends, at 60 cJoule. Therefore, the closed time at 60 cJoule is used as an arbitrary value to discriminate between the glue rate, setting time, of different dextrin samples or other glues that are used for comparative reasons.

Materials

For comparative purposes the following products were used:

- a synthetic folder glue under the name of Enziflex L72 (of Scholten Lijmen B. V.). This glue is based on the combination of a water soluble polymer and a polymer dispersion. Dry solids: 44%, viscosity: 4000 mpa·s (Brookfield RVF; 20° C.; 20 rpm), pH: 4.5, appearance: white liquid;
- a low viscous yellow dextrin under the name of AVEDEX 36LAC14 (of AVEBE b.a.);
- a medium viscous yellow dextrin under the name of GUMSTAR B 1829 N (of AVEBE b.a.);
- an experimentally prepared yellow dextrin, which was prepared as described in example I, with the exception that regular potato starch was used, under the name of type $A_1$;
- an experimentally prepared yellow dextrin according to example I, under the name of type $A_2$;
- an experimentally prepared yellow dextrin according to example II, under the name of type B;
- an experimentally prepared yellow dextrin according to example III, under the name of type C;
- an experimentally prepared yellow dextrin, which was prepared as described in example II, with the exception that cationic amylopectin potato starch was used, under the name of type D;
- an experimentally prepared yellow dextrin according to example IV, under the name of type E;
- an experimentally prepared yellow dextrin according to example V, undet the name of type F;
- an experimentally prepared yellow dextrin, which was prepared as described in example I, with the exception that waxy maize starch was used, under the name of type W.

Performance

The performance of dextrins in terms of viscostability and practical adhesion are summarised in table 1.

TABLE 1 viscostability; practical adhesion

|  | | Viscosity [mPa.s] days | | | | Practical Adhesion Setting time at 60 cJ |
| --- | --- | --- | --- | --- | --- | --- |
|  | [Bx %] | 1 | 7 | 14 | 100 | [s] |
| $A_1$ | 54 | 11800 | solid | solid | solid | 19 |
| $A_2$ | 54 | 4080 | 30000 | 78000 | solid | 23 |
| B | 53 | 1150 | 2260 | 3050 | 4163 | 29 |
| C | 50 | 825 | 1429 | 3750[1] | 3750 | 35 |

TABLE 1-continued viscostability; practical adhesion

|  | | Viscosity [mPa.s] days | | | | Practical Adhesion Setting time at 60 cJ |
| --- | --- | --- | --- | --- | --- | --- |
|  | [Bx %] | 1 | 7 | 14 | 100 | [s] |
| D | 50 | 2880 |  |  |  | 23 |
| E | 42 | 2880 | 6750 | 37000 | solid | 26 |
| F | 38 | 3093 | 3316 | 3585 | 7353 | 18 |
| W | 45 | 16200 | solid | solid | solid | 27 |
| 36LAC14 | 62 | 4239 | 5062 | 6224 | 77279 | 50 |
| L72 | 44 | 4000 | 4000 | 4000 | 4000 | 13 |
| B1829N | 38 | 7762 | 85053 | solid | solid | 20 |

[1]reading after 3 months.

EXAMPLE VII

Pot Life Performance

In order to estimate the pot life performance of a selected group of yellow dextrins, the viscosity stability (viscostability) of some products was determined over a prolonged period of time (max. 180 days). The selection was based on setting time; the criterion was 25 seconds or less. The methods used for the determination of the viscosity stability and setting time are the same as those described under example VI.

Materials

For comparative purposes, the following products were used:

- a medium viscous yellow dextrin under the name of GUMSTAR B 1829 N (of AVEBE b.a.);
- a low viscous yellow dextrin under the name of AVEDEX 36LAC14 (of AVEBE b.a.);
- an experimentally prepared yellow dextrin according to exampleI, with the exception that regular potato starch was used, under the name of type $A_1$;
- an experimentally prepared yellow dextrin according to example I, under the name of type $A_2$;
- an experimentally prepared yellow dextrin according to example V, under the name of type F.

The results are shown in table 2.

TABLE 2 viscostability; practical adhesion

|  | | Viscosity [mPa.s] days | | | Practical Adhesion Setting time at 60 cJ |
| --- | --- | --- | --- | --- | --- |
|  | [Bx %] | 14 | 100 | 180 | [s] |
| $A_1$ | 54 | solid | solid | solid | 19 |
| $A_2$ | 54 | 78000 | solid | solid | 23 |
| F | 38 | 3585 | 7353 | 14470 | 18 |
| 36LAC14 | 62 | 6224 | 77279 | >>100,000 | 50 |
| B1829N | 38 | solid | solid | solid | 20 |

What is claimed is:

1. A process for preparing a starch dextrin which comprises dextrinizing a root or tuber starch from starch granules isolated from a natural source having an amylopectin content of at least 95 wt. %, based on dry substance of the starch, or a derivative of said starch.

2. A process according to claim 1, wherein the starch is potato or tapioca starch.

3. A process according to claim 1, wherein the derivative of the starch is obtained by etherification of the starch.

4. A process according to claim 1, wherein the dextrinizing step is carried out by treating said starch, or derivative of said starch, with a strong Bronsted acid at a temperature of between 75 and 250° C.

5. A process according to claim 1, wherein said dextrinizing step is carried out under substantially dry conditions.

6. A process according to claim 1, wherein the dextrinizing step is performed in the presence of a co-reagent.

7. A process according to claim 6, wherein the co-reagent is a hydrophobic compound, or a combination of hydrophobic compounds.

8. A process according to claim 7, wherein the hydrophobic compound is a carboxylic acid having from 2 to 22 carbon atoms, or an alcohol having from 4 to 22 carbon atoms.

9. A process according to claim 1, wherein said dextrinizing step is carried out in the presence of urea.

10. A process for preparing a starch pyrodextrin which comprises dextrinizing a root or tuber starch having an amylopectin content of at least 95 wt. %, based on dry substance of the starch, or a derivative of said starch, wherein the dextrinizing step comprises heating said starch to produce a pyrodextrin.

11. A process according to claim 10, wherein the starch is potato or tapioca starch.

12. A process according to claim 10, wherein the derivative of the starch is obtained by etherification of the starch.

13. A process according to claim 10, wherein the dextrinizing step is carried out by treating said starch, or derivative of said starch, with a strong Bronsted acid at a temperature of between 75 and 250° C.

14. A process according to claim 10, wherein said dextrinizing step is carried out under substantially dry conditions.

15. A process according to claim 10, wherein the dextrinizing step is performed in the presence of a co-reagent.

16. A process according to claim 15, wherein the co-reagent is a hydrophobic compound, or a combination of hydrophobic compounds.

17. A process according to claim 16, wherein the hydrophobic compound is a carboxylic acid having from 2 to 22 carbon atoms, or an alcohol having from 4 to 22 carbon atoms.

18. A process according to claim 10, wherein said dextrinizing step is carried out in the presence of urea.

19. A process for preparing a starch dextrin which comprises dextrinizing a starch which comprises at least 95 wt. %, based on dry substance of the starch, of amylopectin, or a derivative of said starch, wherein the dextrinizing step is performed in the presence of a co-reagent.

20. A process according to claim 19, wherein the co-reagent is a hydrophobic compound, or a combination of hydrophobic compounds.

21. A process according to claim 20, wherein the hydrophobic compound is a carboxylic acid having from 2 to 22 carbon atoms, or an alcohol having from 4 to 22 carbon atoms.

22. A process according to claim 19, wherein said dextrinizing step is carried out in the presence of urea.

* * * * *